(12) United States Patent
Miller et al.

(10) Patent No.: US 6,238,573 B1
(45) Date of Patent: May 29, 2001

(54) CHLORINATOR AND METHOD OF USING IT

(76) Inventors: John C. Miller; Deborah L. Miller, both of 464 Braddock Dr., Fresno, CA (US) 93720

( * ) Notice: Subject to any disclaimer, the term of this patent is extended or adjusted under 35 U.S.C. 154(b) by 0 days.

(21) Appl. No.: 09/483,903

(22) Filed: Jan. 18, 2000

(51) Int. Cl.[7] ........................................... C02F 1/76
(52) U.S. Cl. ...................... 210/756; 210/764; 210/198.1; 210/205
(58) Field of Search .................................. 210/754, 756, 210/764, 198.1, 205

(56) References Cited

U.S. PATENT DOCUMENTS

| | | |
|---|---|---|
| 4,724,059 * | 2/1988 | Collier . |
| 4,941,599 * | 7/1990 | Reinertz et al. . |
| 5,337,930 * | 8/1994 | Fah et al. . |
| 5,846,418 * | 12/1998 | Thompson et al. . |
| 6,056,167 * | 5/2000 | Dorow et al. . |

* cited by examiner

*Primary Examiner*—David A. Simmons
*Assistant Examiner*—Betsey Morrison Hoey

(74) *Attorney, Agent, or Firm*—John G. Premo

(57) ABSTRACT

A process for producing chlorine for treating flowing water supplies especially micro systems such as drip irrigation systems to control microorganisms present in these waters. It also relates to a chlorinator for practicing the process. The process comprises the steps of (a.) blending in a high pressure tank an excess of calcium hypochlorite and water to form a saturated top of the tank for feeding chlorinated water to a water supply containing microorganisms; (b.) sealing the tank; (c.) displacing a portion of the calcium hypochlorite sink by feeding water from the high pressure, variable speed pump to the dip tube. This forms additional saturated calcium hypochlorite solution; (d.) withdrawing saturated calcium hypochlorite solution through the feed line and adding the calcium hypochlorite to the flowing water supply; and, (e.) controlling the amount of calcium hypochlorite, e.g. chlorination rate fed to the flowing water supply by adjusting the delivery rate of the high pressure pump. The chlorinator for feeding saturated calcium hypochlorite solutions to flowing water systems to control microorganisms comprises (a.) a high pressure tank having a top, a bottom and a sealed removable cover near its top; (b.) a water delivery dip tube within the tank having an inlet and an outlet with the outlet being near the bottom of the tank; (c.) a high pressure, variable speed pump connected to the inlet of the dip tube; (d.) a feed line near the top of the tank for feeding the calcium hypochlorite solutions to the flowing water systems.

8 Claims, 1 Drawing Sheet

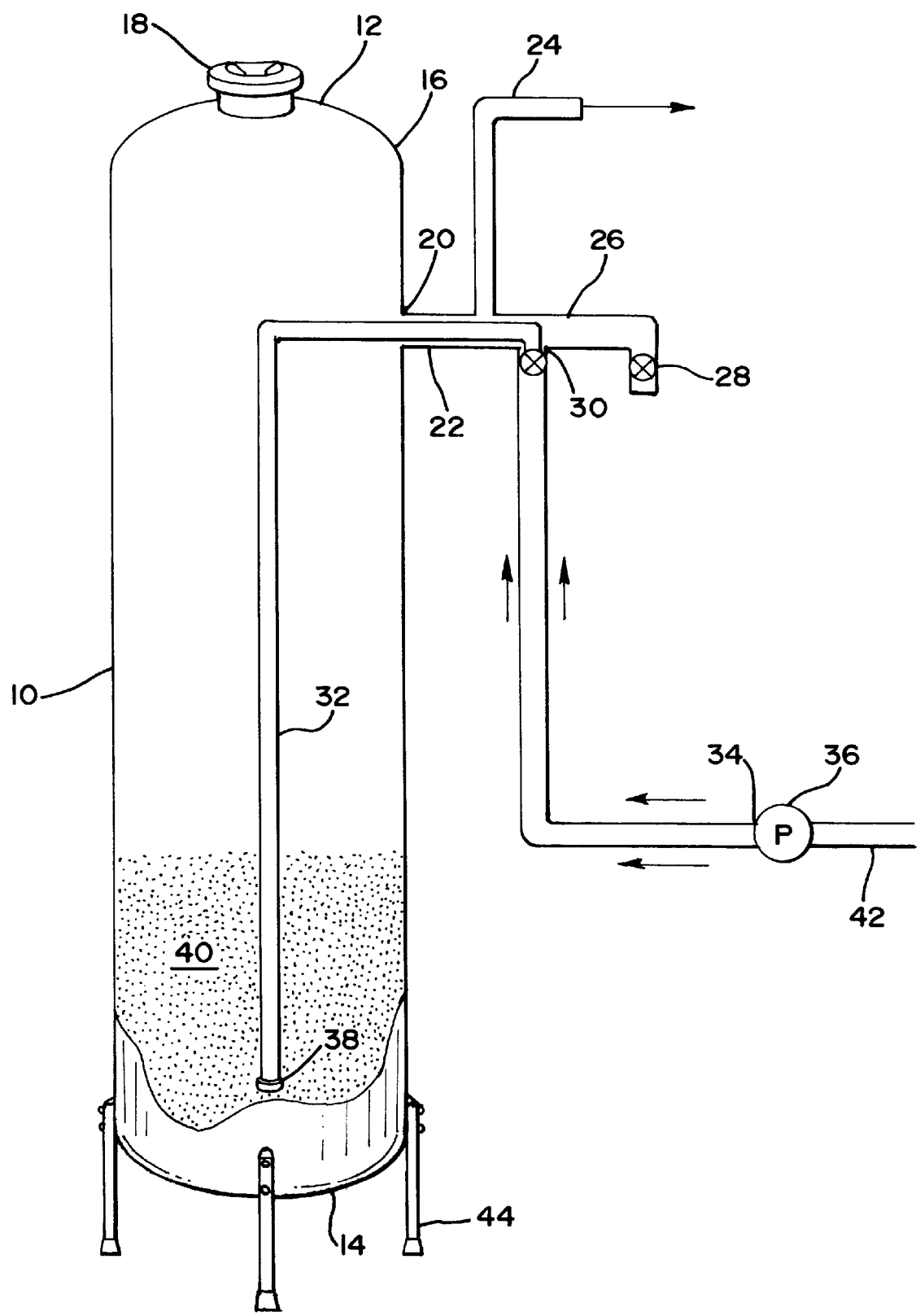

CHLORINATOR AND METHOD OF USING IT

BACKGROUND OF THE INVENTION

1. Field of the Invention

The invention relates to a process and apparatus for chlorinating flowing water supplies to control the growth and reproduction of microorganisms present in these waters.

2. Description of the Prior Art

Micro irrigation systems, as illustrated by drip irrigation systems, and other flowing water supplies, e.g. refinery, steel mill and other industrial wastes are very susceptible to problems created by microbiological organisms present in water. In the case of drip irrigation systems, which are described on page 30 of the Western Fertilizer Handbook, which definition is incorporated herein by reference; the organisms are commonly algae of various types, and bacteria which use iron, manganese, and/or sulfur for their metabolism. However, depending on the water source, any microbiological organism that grows in large colonies can create problems for the micro irrigation systems. Typically these problems include interference with the proper operation of the system such as plugging of the filters resulting in excessive back flushing of the filters, high pressures at the filters, plugging of emitters, poor distribution of water and other chemicals throughout the irrigation system, segregated areas with extremely high or low pressures and the need for frequent hose and flushing which is very labor intensive and costly.

Currently used for microorganism control is chlorine gas or bleach, a dilute solution of sodium hypochlorite. In the case of chlorine gas, many areas have banned the use of the gas due to the hazards of handling it. Although it is economical, the handling problems and special training of the personnel have dramatically, if not totally, eliminated its use.

Bleach is much easier to handle but due to its low concentration of available chlorine (maximum 12% available Cl2) large volumes of solution must be used which present other handling and safety issues.

In either case, the handling, safety and liability issues with these materials resulted in their limited and occasional use in micro irrigation systems as a "shock treatment" (15–20 ppm Cl2) or "superchlorination" (between 25–1000 ppm Cl2). Bleach has never been fed continuously and gaseous chlorine only rarely fed continuously. In both cases, these chlorine sources are fed as a "one time" treatment to a reservoir or directly into the irrigation system.

Calcium hypochlorite is a chlorine source that eliminates the handling problems that are present with chlorine gas and bleach. Calcium hypochlorite contains 67 percent available chlorine and is a solid. As a result, high concentrations of available chlorine are achievable and the solid can be handled and transported very easily. Calcium hypochlorite solid has been used routinely as a chlorine source in the treatment of swimming pools and related systems when a chlorine source is required for biological control. These systems are, however, at ambient pressures. To feed any chlorine-based product into a micro irrigation system, a pressurized system is required. In the case of gaseous chlorine, feeding into a pressurized system is easy due to the high partial pressure of chlorine gas. In the case of bleach, a solution of bleach can be fed into the irrigation system using high pressure pumps, but there are three main problems with the bleach approach.

First as mentioned earlier, large storage tanks or many drums would have to be used which presents handling problems.

Secondly, a chlorine source such as bleach will "vapor lock" the high pressure delivery pump. This happens because the hypochlorite anion, in solution, is in equilibrium with chlorine gas. Tiny bubbles form gas pockets which stop the pump from delivering the bleach solution into the system. When this happens, the pump has to be continuously re-primed making this approach extremely difficult, if not impossible.

Thirdly, the high pressure pumps and related equipment must be made of stainless steel or other suitable material due to the corrosive nature of the bleach. This makes such systems too expensive for many applications.

SUMMARY OF THE INVENTION

The invention comprises a process for producing chlorine for treating flowing water supplies especially small scale or micro systems such as drip irrigation systems to control microorganisms present in these waters. It also relates to a chlorinator for practicing the process. The process comprises the steps of (a.) blending in a high pressure tank an excess of calcium hypochlorite and water to form a saturated solution of calcium hypochlorite and a sink of calcium hypochlorite with the high pressure tank having a top and a bottom. Within the tank is a water delivery dip tube having an inlet and an outlet with the outlet being near the bottom of the tank. A component of the system is a high pressure, variable speed pump, connected to the inlet of the dip tube and a feed line near the top of the tank for feeding chlorinated water to a water supply containing microorganisms; (b.) sealing the tank; (c.) displacing a portion of the calcium hypochlorite sink by feeding water from the high pressure, variable speed pump to the dip tube: this forms additional saturated calcium hypochlorite solution; (d.) withdrawing saturated calcium hypochlorite solution through the feed line and adding the calcium hypochlorite to the flowing water supply; and, (e.) controlling the amount of calcium hypochlorite, e.g. chlorination rate fed to the flowing water supply by adjusting the delivery rate of the high pressure pump.

An equation for determining the chlorination rate to the flowing water supply is presented below:

$$A = \frac{B \times C \times D}{E \times F \times G}$$

where; A is the water feed rate in gallons/hour

B is the concentration of chlorine desired in grams/milliliter.

C is the flow rate of the irrigation system in gallons/minute

D is the conversion factor for minutes to hours.

E is the amount of available chlorine in calcium hypochlorite at room temperature in gram/gram.

F is the saturation point of calcium hypochlorite at room temperature in grams/gram.

G is the density of a 15.25 percent solution of calcium hypochlorite at room temperature in grams/milliliter.

The process is most beneficial and gives excellent results where the flowing water is the water used in drip irrigation.

The chlorinator for feeding saturated calcium hypochlorite solutions to flowing water systems to control microorganisms comprises (a.) a high pressure tank having a top, a bottom and a sealed removable cover near its top; (b.) a water delivery dip tube within the tank having an inlet and an outlet with the outlet being near the bottom of the tank; (c.) a high pressure, variable speed pump connected to the inlet of the dip tube; (d.) a feed line near the top of the tank for feeding the calcium hypochlorite solutions to the flowing water systems.

In specific preferred embodiments of the invention the dip tube enters the high pressure tank through the feed line. The dip tube is flexible plastic tubing and contains a check valve. In other preferred embodiments the tank is fitted with a pressure relief valve. The variable speed high pressure pump may be replaced by a combination of a high pressure pump in combination with a flow control valve.

BRIEF DESCRIPTION OF THE DRAWING

The drawing is a partially cut-away vertical view of the chlorinator of the invention.

DESCRIPTION OF THE PREFERRED EMBODIMENTS

With particular reference to the drawing there is shown a high pressure domed cylindrical tank 10 having a top 12 a bottom 14 and circumference 16. Top 12 of tank 10 is fitted with a removable threaded cap 18. The circumference 16 near top 12 of the tank has a threaded opening 20 fitted with feed line 22.

The feed line contains three branches. The first branch 24 delivers calcium hypochlorite solution to the flowing water supply to be treated. The second branch 26 is fitted with pressure relief valve 28. The third branch 30 has within its interior a dip tube 32 whose inlet 34 is connected to the discharge side of pump 36. The outlet 38 of dip tube 32 is positioned just above the bottom 14 of tank 10. Surrounding the dip tube is a sink of partially suspended calcium hypochlorite 40. The inlet 42 of pump 36 is desirably connected to a small tank of fresh water (not shown). By using appropriate couplings the tank 10, feed line 22 and dip tube 32 can be relocated and repositioned on legs 44 which are located on the bottom 14 of tank 10.

In operation the high pressure tank 10 which is preferably constructed of chlorine resistant fiberglass or stainless steel is partially filled by pump 36, with water and an excess of calcium hypochlorite e.g. about 15% by weight, to form the sink 40. The tank is then sealed by threaded cap 18. Fresh water is fed by pump 36 to the delivery tube 32 into the bottom 14 of tank 10. Pump 36 preferably is a high pressure variable speed pump. As water fills the tank it solubilizes some of the calcium hypochlorite to form a saturated solution and displaces some of this saturated solution into the first branch of the feed line 24 where it is directed to the flowing water system to be treated. The pressure needed to be produced by the pump to treat typical micro irrigation systems is between about 20 to 100 psi. Increased pressures can be use if the tank is make of stainless steel. When stainless steel tanks are used the pressure range may be extended to as much as about 500 psi. Because of the sink of calcium hypochlorite 40 it is possible to treat flowing water systems for long periods of time before recharging with additional calcium hypochlorite is required.

As indicated, the equation presented above is used to determine the feed rate of available chlorine to a flowing water system. An illustration as to how this equation is used is as follows. For a typical irrigation water flow rate of 1000 gallons/minute and a chlorine treatment level of 0.5 ppm, the water feed rate into the chlorinator would be:

$B=0.5 \times 10^{-6}$ gram/mililliter
$C=1000$ gallons/minute
$D=60$ minutes/hour
$E=67$ percent=0.67 gram/gram
$F=15.25$ percent =0.1525 gram/gram
$G=1.134$ gram/milliliter Substituting these values into the above equation yields a water feed into the chlorinator of 0.259 gallons/hour.

Typical feed rates are set to achieve chlorine feed rates of approximately 0.5 ppm available chlorine. This level can be adjusted up or down depending on the biological load of the water source. To determine this loading the irrigation system is turned on and the chlorinator turned on. The available chlorine level is measured in the field at the farthest point in the irrigation system. If a chlorine level at the farthest point in the irrigation system is at 0.1 to 0.2 ppm, adequate chlorine is reaching all points in the field. Depending on the results of the simple chlorine field test, the water feed source to the chlorinator can be increased or decreased to achieve the requisite chlorine levels throughout the field.

It is evident that the materials of construction for the piping and the pump must be chlorine resistant. PVC piping gives good results. The tank is preferably made of fiberglass with the threaded openings being made of stainless steel. To simplify construction the dip tube is flexible tubing which allows it to be easily drawn through the feed line. When flexible tubing is used for this purpose it is necessary to weigh its outlet end 38 or fasten it to a rigid support to prevent it from moving or floating in the tank. It has been found a simple method of maintaining the outlet end 32 of a dip tube made of flexible tubing near the bottom of the tank is to make up a rigid PVC pipe having an interior diameter capable of receiving the tubing and a length slightly shorter than the interior height of the tank. The bottom of the pipe is fitted with a T. The flexible tubing is threaded into the pipe and allowed to exit through one leg of the T. It is then fitted with a coupling having a size such as to prevent the tube from being displaced from the T which is allowed to rest on the bottom of the tank.

The advantage of placing the dip tube inside the feed line is that it means only one opening in circumference 16 of tank 10 is required. This aids in maintaining the structural integrity of the tank so that higher pressure will be less likely to cause tank failure.

The tank, when made of fiberglass and used for treating drip irrigation systems, typically would have a capacity of 29 gallons and would have a pressure rating of about 125 psi.

We claim:

1. A process for producing chlorine for treating a flowing water supply having a flow rate with the produced chlorine having a chlorination feed rate and concentration sufficient to control microorganisms present in the flowing water supply comprising the steps of:

a. blending in a high pressure tank an excess of calcium hypochlorite and water at a water feed rate sufficient to form a saturated solution of calcium hypochlorite and a sink of calcium hypochlorite with the high pressure tank having a top and a bottom, and within the tank a water delivery dip tube having an inlet and an outlet with the outlet being near the bottom of the tank, a high pressure, variable speed pump, connected to the inlet of the drip tube and a feed line near the top of the tank for feeding chlorinated water to a water supply containing microorganisms;

b. sealing the tank;

c. displacing a portion of the calcium hypochlorite sink by feeding water from the high pressure, variable speed pump to the drip tube to form additional saturated calcium hypochlorite solution;

d. withdrawing saturated calcium hypochlorite solution through the feed line and adding the calcium hypochlorite to the flowing water supply; and e. controlling the chlorination feed rate to the flowing water supply by adjusting the delivery rate of the high pressure speed pump.

2. The process of claim 1 where the chlorination feed rate to the flowing water supply, based on the water feed rate to the high pressure tank, the concentration of the chlorine desired in the flowing water supply and the flow rate of the flowing water supply is determined by the following equation:

$$A = \frac{B \times C \times D}{E \times F \times G}$$

where;

A is the water feed rate to the high pressure tank in gallons/hour;

B is the concentration of chlorine desired in the flowing water supply in grams/milliliter;

C is the flow rate of the flowing water supply in gallons/minutes,

D is the conversion factor for minutes to hours;

E is the amount of available chlorine in calcium hypochlorite at room temperature in gram/gram;

F is the saturation point of calcium hypochlorite at room temperature in grams/gram;

G is the density of a 15.25 percent solution of calcium hypochlorite at room temperature in grams/milliliter.

3. The process of claim 1 where the flowing water supply is the irrigation water used in drip irrigation.

4. A chlorinator for feeding saturated calcium hypochlorite solutions to flowing water systems to control microorganisms comprising:

a. a high pressure tank having a top, a bottom and a sealed removable cover near its top;

b. a water delivery dip tube within the tank having an inlet and an outlet with the outlet being near the bottom of the tank;

c. a high pressure, variable speed pump connected to the inlet of the dip tube;

d. a feed line near the top of the tank for feeding the calcium hypochlorite solutions to the flowing water systems.

5. The chlorinator of claim 4 where the dip tube enters the high pressure tank through the feed line.

6. The chlorinator of claim 5 where the dip tube is flexible plastic tubing.

7. The chlorinator of claim 4 where the dip tube contains a check valve.

8. The chlorinator of claim 4 where the tank is fitted with a pressure relief valve.

* * * * *